United States Patent
Marzelius et al.

(10) Patent No.: US 9,745,950 B2
(45) Date of Patent: Aug. 29, 2017

(54) SUBMERSIBLE POWER PLANT

(71) Applicant: MINESTO AB, Västra Frölunda (SE)

(72) Inventors: Olof Marzelius, Västra Frölunda (SE); Erik Dölerud, Göteborg (SE)

(73) Assignee: MINESTO AB, Västra Frölunda (SE)

( * ) Notice: Subject to any disclaimer, the term of this patent is extended or adjusted under 35 U.S.C. 154(b) by 0 days.

(21) Appl. No.: 15/113,330

(22) PCT Filed: Feb. 7, 2014

(86) PCT No.: PCT/SE2014/050156
§ 371 (c)(1),
(2) Date: Jul. 21, 2016

(87) PCT Pub. No.: WO2015/119543
PCT Pub. Date: Aug. 13, 2015

(65) Prior Publication Data
US 2017/0009731 A1   Jan. 12, 2017

(51) Int. Cl.
*F03B 13/10*   (2006.01)
*F03B 17/06*   (2006.01)
*B63G 8/00*    (2006.01)

(52) U.S. Cl.
CPC .............. *F03B 13/10* (2013.01); *B63G 8/001* (2013.01); *F03B 17/061* (2013.01);
(Continued)

(58) Field of Classification Search
CPC .......... F03B 13/10; F03B 17/00; F03B 17/06; F03B 17/061; B63G 8/00; B63G 8/18; B63G 8/22; B63G 8/24
(Continued)

(56) References Cited

U.S. PATENT DOCUMENTS 2,501,696 A * 3/1950 Souczek ............... F03B 17/061
290/43
6,091,161 A * 7/2000 Dehlsen ............... F03B 17/061
290/43
(Continued)

FOREIGN PATENT DOCUMENTS

EP   1816345 A1   8/2007
GB   2411209 A    8/2005
(Continued)

OTHER PUBLICATIONS

International Search Report received for PCT Patent Application No. PCT/SE2014/050156, mailed Aug. 13, 2015, 5 pages.
(Continued)

*Primary Examiner* — Lars A Olson
(74) *Attorney, Agent, or Firm* — Morrison & Foerster LLP

(57) ABSTRACT

The invention relates to a submersible power plant. The power plant comprises a structure and a vehicle. The vehicle is arranged to be secured to the structure by means of at least one tether. The vehicle is arranged to move in a predetermined trajectory by means of a fluid stream passing the vehicle. The vehicle comprises a first wing and a second wing, where the first wing is arranged at a first distance D1 from the second wing in a longitudinal direction, and the first wing is arranged at a second distance D2 from the second wing in a lateral direction.

9 Claims, 3 Drawing Sheets

(52) U.S. Cl.
CPC ..... *F05B 2220/32* (2013.01); *F05B 2240/917* (2013.01); *Y02E 10/28* (2013.01); *Y02E 10/38* (2013.01)

(58) Field of Classification Search
USPC .............. 114/312; 416/85, 87, 89, 101, 121; 290/43, 54
See application file for complete search history.

(56) References Cited

U.S. PATENT DOCUMENTS

| | | |
|---|---|---|
| 6,923,622 B1 | 8/2005 | Dehlsen |
| 8,237,304 B2* | 8/2012 | Dehlsen ................ F03B 17/061 290/43 |
| 2010/0295320 A1 | 11/2010 | Bevirt et al. |

FOREIGN PATENT DOCUMENTS

| | | |
|---|---|---|
| WO | 8100595 A1 | 3/1981 |
| WO | 2006054084 A1 | 5/2006 |
| WO | 2007139412 A1 | 12/2007 |

OTHER PUBLICATIONS

International Preliminary Report on Patentability received for PCT Patent Application No. PCT/SE2014/050156, mailed Aug. 13, 2015, 6 pages.

Written Opinion received for PCT Application No. PCT/SE2014/050156, mailed on Nov. 7, 2014, 6 Pages.

* cited by examiner

SUBMERSIBLE POWER PLANT

CROSS-REFERENCE TO RELATED APPLICATION

This application is a U.S. National Stage patent application of PCT/SE2014/050156, filed on Feb. 7, 2014, the entire content of which is incorporated herein by reference.

TECHNICAL FIELD

The invention relates to a submersible power plant. The power plant comprises a structure and a vehicle. The vehicle is arranged to be secured to the structure by means of at least one tether.

The vehicle is arranged to move in a predetermined trajectory by means of a fluid stream passing the wing.

BACKGROUND ART

A submersible power plant is known in the art from EP 1816345. The power plant in EP 1816345 comprises a vehicle comprising one wing with a nacelle comprising a turbine and generator attached to the wing. The power plant is arranged to move in a predetermined trajectory by means of a fluid stream passing the wing.

A winged body moving through a fluid, experiences induced drag. The induced drag reduces the efficiency of the wing and decreases the lift force. At the tips of the wing fluid flows from the underside of the wing to the top side of the wing creating wing tip vortices, reducing the effective angle of attack of the wing. The induced drag of the wing from the fluid flowing over the wing thus leads to that the wing must have a large area in order to generate a desired lift, i.e. the induced drag reduces the overall efficiency of the wing. The vehicle of the power plant of EP 1816345 operates in tidal streams which can vary greatly in velocity. In order for the fluid stream to propel the vehicle in low velocity streams, the wing of the vehicle of the power plant of EP 1816345 needs a large planform area to generate the lift needed to achieve the desired vehicle velocity. This leads to that a power plant can be difficult both to manufacture and to handle.

EP 1816345 discusses the possibility of having a vehicle comprising two or more wings arranged on top of each other, separated by means of spacer elements. Having two wings on top of each other does not address all of the above mentioned problems, due to that such a solution leads to large pressure gradients over the wings reducing the effectiveness of the wings. There is thus a need for an improved submersible power plant.

SUMMARY OF THE INVENTION

One object of the present invention is to provide an inventive submersible power plant where the previously mentioned problems are at least partly avoided. This object is achieved by the features of the characterising portion of claim 1.

The invention relates to a submersible power plant. The power plant comprises a structure and a vehicle. The vehicle is arranged to be secured to the structure by means of at least one tether. The vehicle is arranged to move in a predetermined trajectory by means of a fluid stream passing the vehicle. The vehicle comprises a first wing and a second wing, where the first wing is arranged at a first distance from the second wing in a longitudinal direction, and the first wing is arranged at a second distance from the second wing in a lateral direction.

By using two wings and separating the wings both longitudinally and laterally, the area of each wing can be decreased while still maintaining the same efficiency. Alternatively, two wings with the same total area as the wing of the prior art vehicle will have an increased lift over drag ratio and thereby an increased efficiency.

Placing two wings directly on top of each other leads to that the pressure fields created around each wing interacts with each other by amplifying the low and high pressure zones around the wings. Large pressure gradients are thereby created leading to problems with vortex creation and flow separation. The present invention instead arranges the wings at a distance laterally, leading to that the different pressure zones are made to interact by attenuating the pressure gradients.

One alternative solution could be to have the two wings arranged in a longitudinal direction with one wing after the other in essentially the same longitudinal plane. In this case the wing tip vortices created by the first wing coincide with the wing tip vortices created by the second wing hand. The wing tips vortices are thereby amplified such that the total induced drag will essentially be the same as if the vehicle comprised only one wing. This configuration thus leads to a less effective wing configuration.

By separating the wings longitudinally as well as laterally, the vortices created by the first wing and the second wing respectively are separated. This leads to that the effects of placing two wings directly on top of each other or placing two wings in a longitudinal direction with one wing after the other in essentially the same longitudinal plane as described above are significantly reduced. The first wing is preferably located above, in a lateral direction, and in front of, in a longitudinal direction, the second wing. This configuration gives rise to a higher degree of vortex separation than the opposite.

Induced drag can mathematically be described with the equations $$C\_Di = C\_L \tan(\alpha\_i) = C\_L^2/\pi A \qquad (1)$$

and $$D\_i = W^2/(\pi q b^2) \qquad (2)$$

where C_Di is the minimum coefficient of the lift force component in a direction of flow, C_L is the lift coefficient, α_i is the induced angle, A is the aspect ratio of the wing, D_i is the induced drag, W is the weight of the wing which is also equal to lift force L, q is the dynamic pressure and b is the span of the wing. A more detailed description can be found in Fluid-Dynamic Drag, Practical Information on Aerodynamic Drag and Hydrodynamic resistance, Sighard F. Hoerner (1965, 1992); Hoerner Fluid Dynamics, Bakersfield, USA; LCCN 64-019666.

Reducing the lift force by one half results in a reduction of the induced drag to one quarter. A vehicle having two wings with a lift force corresponding to the lift force of one wing, i.e. where each wing has half the lift force of the original wing, will have an induced drag half of the induced drag of a vehicle having only one wing, e.g. compared to the vehicle in EP 1816345.

A first right end of the first wing and a second right end of the second wing are connected by a first hydrodynamic element and a first left end of the first wing and a second left end of the second wing are connected by a second hydrodynamic element, the first and second wing thereby forming a closed wing. A closed wing does not have any wing tips which create wingtip vortices. This configuration leads to a decreased overall drag and thereby increased efficiency. Due to the closed wing configuration, the area of the wings can be made smaller by decreasing the wing span. This leads to that the vehicle is more compact and thereby easier to handle during installation and maintenance. The fact that the area of the wings can be made smaller while maintaining efficiency creates an opportunity for various designs of a vehicle for an improved power plant. A closed wing having the same total planform area as a vehicle with only one wing will experience less induced drag leading to a more efficient vehicle, i.e. more lift force creating more power and speed. A closed wing producing the same total lift force as a vehicle with only one wing can have a smaller planform area due to the reduced induced drag, leading to a lower frictional or viscous resistance.

A shorter wing span further allows the vehicle to turn more sharply without increasing the risk of the inner wingtip stalling. A smaller turn radius leads to that the power plant can be installed on sites with smaller depths than previously possible as the distance from the surface and the bottom to the deepest and shallowest point of the trajectory can be reduced.

The hydrodynamic elements closing the wings may be hydrodynamically shaped. The hydrodynamic elements, which extend laterally, can be used as lateral wings if they are hydrodynamically shaped. This allows for easier turning of the vehicle. Due to that the vehicle of the power plant is attached by a tether, the vehicle does not bank like an airplane, but instead yaws when changing direction along the predetermined trajectory.

Hydrodynamic elements extending laterally, e.g. lateral wings, provide the vehicle with lateral steering surfaces producing lift needed for the vehicle to turn by means of yaw.

Further, by having a closed wing with hydrodynamically shaped hydrodynamic elements, a similar effect as for horizontal wings is achieved, i.e. no wingtip vortices are created from the vertical surfaces which may be the case if winglets were used which did not close the wings.

The vehicle may comprise a nacelle comprising a generator, the generator being attached to a turbine, where the nacelle is positioned between the first wing and the second wing. By equipping the vehicle with a nacelle comprising a generator attached to a turbine the vehicle can produce power by means of the turbine rotating when the vehicle travels through the fluid, thereby rotating the generator. By having a vehicle with a wing configuration according to the invention the vehicle can be made smaller while maintaining efficiency or the efficiency of the power production can be increased by maintaining the size of the vehicle. It is also possible to extract power from other parts of the power plant, for instance by attaching a linear generator or a winch to the tether. Power is then generated from the variation in distance between the vehicle and the foundation during the trajectory. A vehicle according to the invention further allows for more protection for the rudder as most or the entire rudder is located between the wings.

The first wing and the second wing can have the same shape or have different shape. In case the first wing and the second wing have the same wing shape, this leads to an easier and less expensive production process as there is no customization required for any of the wings. It is also less expensive to hold replacement wings as a single type of wing can replace both the first wing and the second wing. In case the first wing and the second wing have different wing shapes it is possible to tailor the hydrodynamic properties of the vehicle for specific site conditions, thereby further increasing the efficiency of the vehicle. It is also possible to tailor the vehicle so that the power plant can be installed on sites with shallower depth than a prior art power plant as the turning radius can be decreased. In addition to having the same or different shapes, the first wing and the second wing can have the same planform area or different planform areas further increasing the tailoring possibilities.

The pitch angles of the first wing and the second wing can be adjusted relative each other. This enables steering in pitch direction of the vehicle. Besides allowing increased steering ability of the vehicle, the wings may also be pivoted to an emergency brake position wherein the vehicle is not propelled by the fluid stream. In the emergency brake position the pitch angle of the wings are adjusted to a position in which the forces acting on each wing by the incoming fluid stream are balanced out or closed to balanced out, leading to that the vehicle lies essentially motionless in the water. The emergency brake can be used if the vehicle malfunctions and needs to be repaired or if the velocity of the vehicle exceeds a design velocity, which may cause structural damage to the vehicle or other parts of the power plant.

The tether may be attached to the vehicle by means of struts. Front struts are attached to the first wing and a rear strut is attached to the second wing. By dividing the wings in a longitudinal direction it is possible to attach struts which attach the tether to the vehicle to both wings. Distributing the wing area in a longitudinal direction gives rise to an increase of pitch inertia, where pitch is a rotation around an axis being parallel to the wing span. The increase in pitch inertia is caused by two phenomena. Due to that mass is moved away from the centre of gravity, an increase in inertia is caused. This can be derived from rigid body dynamics. An additional increase in inertia arises from that the surface which moves through the water is increased. Accelerating a body in a fluid adds inertia due to that more fluid need to be displaced; this is known as added mass. Separating the first wing and the second wing in a longitudinal direction gives rise to a substantial increase of added mass when pitching the vehicle. One advantage with this configuration is that the need for a stabilizing torque from the tether is reduced. This allows for use of shorter struts which reduces the drag from the struts. By attaching the front struts to the first wing and the rear strut to the second wing the vehicle will experience further increased pitch stability due to that the distance between the front and rear struts is increased. The increase in distance between the attachment points for the front and rear struts increases the moment of inertia around the point where the struts attach to the tether. This further allows for use of shorter struts to be used in this configuration. Shorter struts simplify installation and maintenance of the vehicle. Reduction in drag is caused by the decreased area of the shorter struts.

The wings can for instance be made of metal, various laminates or a combination thereof. Carbon fibre laminate and glass fibre laminate are two possible laminate options. Other materials are also conceivable. By shortening the wing span the use of a lighter material such as a laminate is made possible. A smaller wing also leads to a lower material cost for the vehicle, as for instance thinner walls or beams can be made of a less expensive material such as glass fibre laminate. Using glass fibre laminate may further decrease risks and design costs concerning bimetallic/galvanic corrosion of attached/built in metal parts in the prior art vehicle.

The vehicle is provided with steering means and a control unit is arranged to provide control signals to the steering means for steering the vehicle in the predetermined trajectory. The steering means can include one or more control surfaces located on either of or both of the first and second wing.

The vehicle of the power plant according to the invention can assume an emergency position. In the emergency position the pitch angle of the first wing and the second wing are adjusted relative each other such that the net lift produced by the fluid stream passing the wings of the vehicle is zero or close to zero. This means that the vehicle is not propelled by the fluid stream and the vehicle will not continue along its predetermined trajectory.

DETAILED DESCRIPTION

Figure 1:
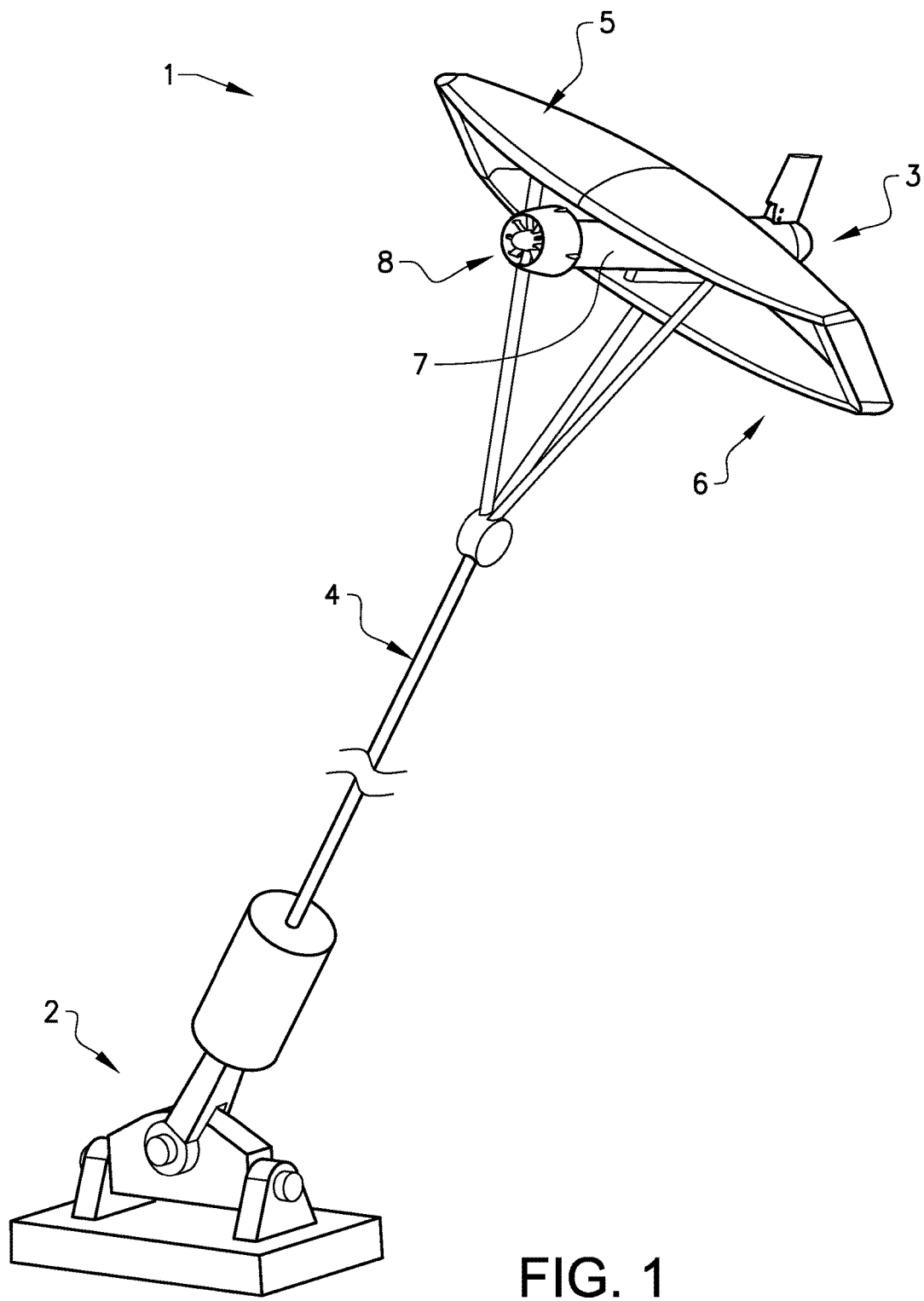
FIG. 1 schematically shows a power plant according to the invention.

FIG. 1 schematically shows a power plant 1 according to the invention. The power plant 1 comprises a structure 2 and a vehicle 3. The vehicle 3 is arranged to be secured to the structure 2 by means of at least one tether 4. The vehicle 3 comprises a first wing 5 and a second wing 6. The vehicle 3 is arranged to move in a predetermined trajectory by means of a fluid stream passing the wings of the vehicle 3. The vehicle 3 further comprises a nacelle 7 comprising a generator. The nacelle 7 is attached to a turbine 8. The nacelle 7 is positioned between the first wing 5 and the second wing 6. In FIG. 1 the vehicle 3 comprises a closed wing. The closed wing is described in further detail below. It is also possible for the vehicle 3 to have two separate wings without winglets or two separate wings, with one or both wing having winglets. In FIG. 1 the structure 2 is seen to be placed below the vehicle 3, this can for instance be at the bottom of the ocean or of a sea. It is also possible that the structure 2 is located above the vehicle 3. The structure 2 may in this case be a boat, a bridge, a dock or similar structure.

Figure 2:
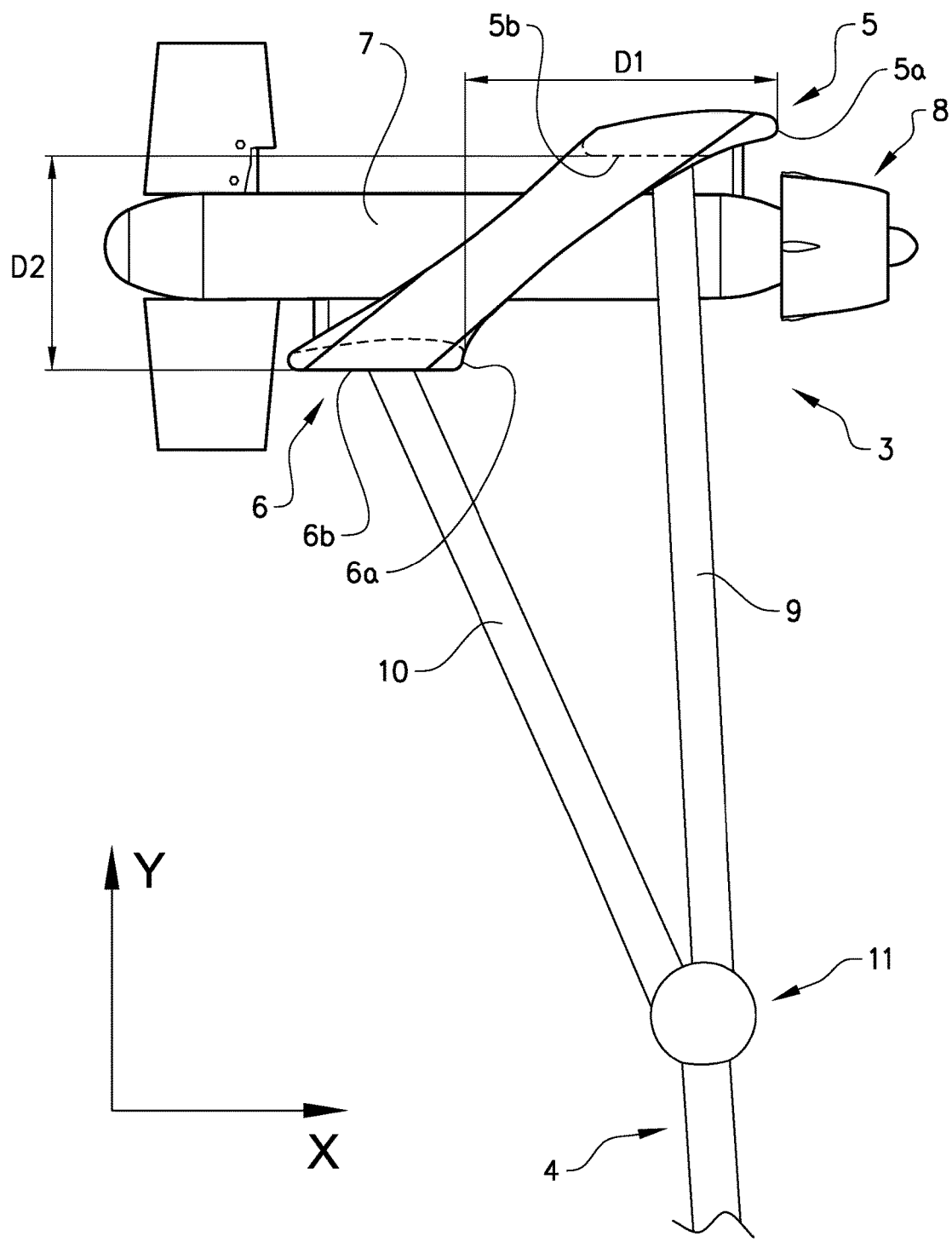
FIG. 2 schematically shows a vehicle of a power plant according to the invention in a side view.

FIG. 2 schematically shows a vehicle 3 of a power plant 1 according to the invention in a side view. The vehicle 3 is positioned in a reference frame and has a lateral extension along a y-axis of the reference frame and a longitudinal extension along an x-axis of the reference frame. The x-axis runs in a direction from the rear of the vehicle 3 to the front of the vehicle 3. The y-axis runs in a direction perpendicular to the x-axis from the bottom of the vehicle to the top of the vehicle. As can be seen from FIG. 2, the first wing 5 is arranged at a first distance D1 from the second wing 6 in a longitudinal direction, measured from a front edge 5a of the first wing 5 to a front edge 6a of the second wing 6. The first wing 5 is further arranged at a second distance D2 in a lateral direction from the second wing 6, measured from a lower surface 5b of the first wing 5 to a lower surface 6b of the second wing 6. The first and second distances D1 and D2 are between 0-b, specifically between c-b/2, where b is the span width and c is the chord length of the wings.

The first and second distances D1, D2 can of course be measured from other points on the first and second wings 5, 6.

The hydrodynamic elements 14, 17 can take any suitable planform shape in order to obtain desired characteristics.

Front struts 9 are attached to the first wing 5 and a rear strut 10 is attached to the second wing 6. The front struts 9 and rear strut 10 are attached to the tether 4 with a tether coupling 11.

Figure 3:
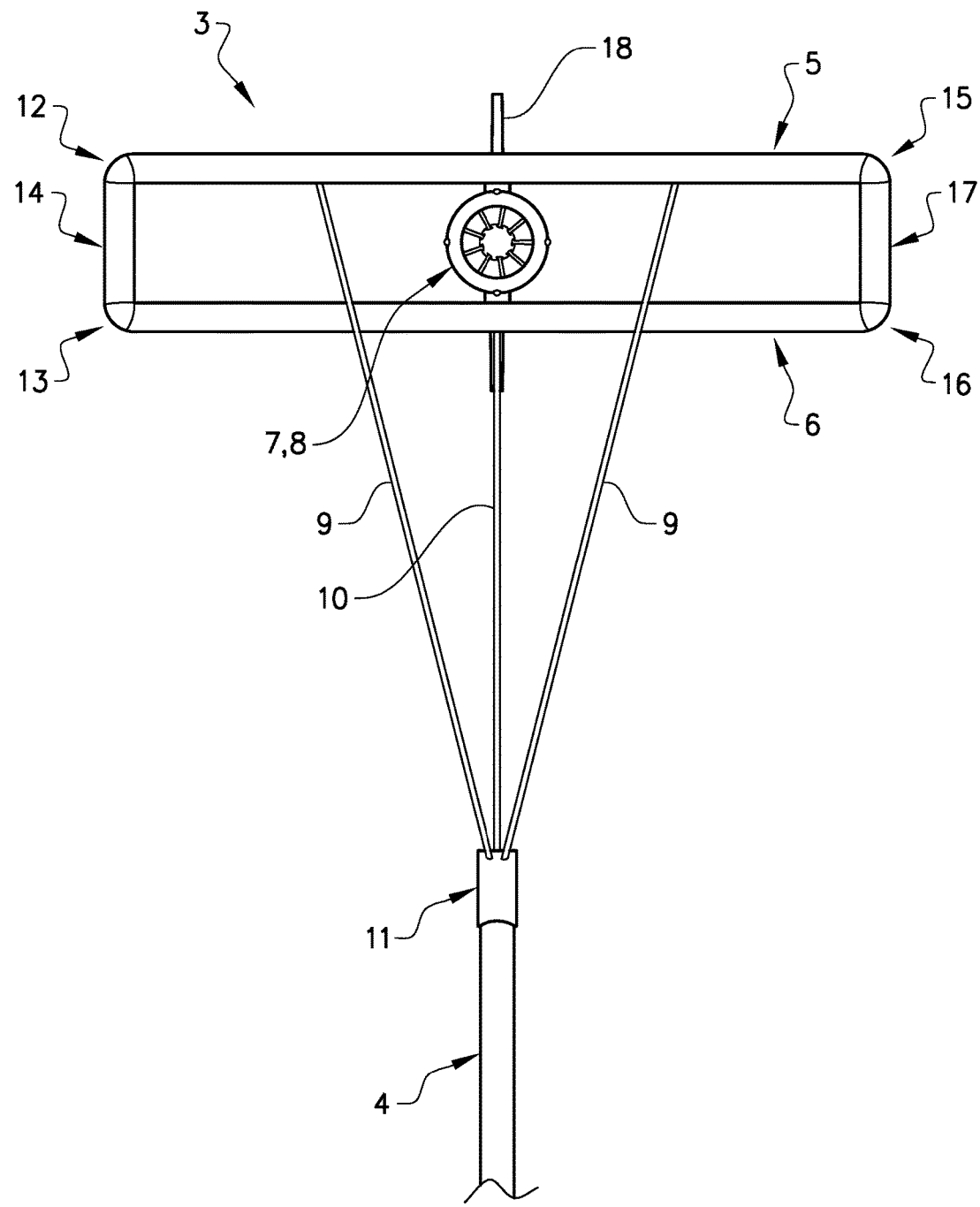
FIG. 3 schematically shows a vehicle of a power plant according to the invention in a front view.

FIG. 3 schematically shows a vehicle 3 of a power plant according to the invention in a front view. FIG. 3 shows that a first right end 12 of the first wing 5 and a second right end 13 of the second wing 6 are connected by a first hydrodynamic element 14 and a first left end 15 of the first wing 5 and a second left end 16 of the second wing 6 are connected by a second hydrodynamic element 17, the first wing 5 and the second wing 6 thereby forming a closed wing. The nacelle 7 further comprises a rudder 18 located at a rear end of the nacelle 7. As can be seen in FIG. 3 the rudder 18 is partially shielded by the closed wing. This increases the protection of the rudder from debris. The hydrodynamic elements 14, 17 can take any suitable airfoil shape in order to obtain desired characteristics. The closed wing has square connections between the wings 5, 6 and the hydrodynamic elements 14, 17 as seen in FIG. 3. The connections between wings 5, 6 and the hydrodynamic elements 14, 17 can also be rounded such that a more annular shape is acquired. Other kind of suitable connections between the wings 5, 6 and the hydrodynamic elements 14, 17 are also conceivable.

Reference signs mentioned in the claims should not be seen as limiting the extent of the matter protected by the claims, and their sole function is to make the claims easier to understand. As will be realised, the invention is capable of modification in various obvious respects, all without departing from the scope of the appended claims. Accordingly, the drawings and the description thereto are to be regarded as illustrative in nature, and not restrictive.

The invention claimed is:

1. A submersible power plant, comprising:
    a structure; and
    a vehicle, the vehicle being arranged to be secured to the structure by at least one tether; the vehicle being arranged to move in a predetermined trajectory by a fluid stream passing the vehicle, the vehicle being positioned in a reference frame with a first extension along an x-axis of the reference frame and a second extension along a y-axis of the reference frame,
    where the x-axis runs in a direction from a rear of the vehicle to a front of the vehicle, and the y-axis runs in a direction perpendicular to the x-axis from a bottom of the vehicle to a top of the vehicle,
    the vehicle comprises a first wing and a second wing, where the first wing is arranged at a first distance above the second wing along the y-axis, and the first wing is arranged at a second distance in front of the second wing along the x-axis, and the vehicle comprises a nacelle comprising a generator, the nacelle being attached to a turbine, where the nacelle is positioned between the first wing and the second wing.

2. The submersible power plant according to claim 1, wherein a first right end of the first wing and a second right end of the second wing are connected by a first hydrodynamic element, and a first left end of the first wing and a second left end of the second wing are connected by a second hydrodynamic element, the first wing and second wing thereby forming a closed wing.

3. The submersible power plant according to claim 2, wherein the hydrodynamic elements are hydrodynamically shaped.

4. The submersible power plant according to claim 1, wherein the first wing and the second wing have the same shape.

5. The submersible power plant according to claim 1, wherein the first wing and the second wing have different shapes.

6. The submersible power plant according to claim 1, wherein the first wing and the second wing have the same planform area.

7. The submersible power plant according to claim 1, wherein the first wing and the second wing have different planform areas.

8. The submersible power plant according to claim 1, wherein a pitch angle of the first wing and the second wing can be adjusted relative to each other.

9. The submersible plant according to claim 1, wherein the tether is attached to the vehicle by struts, wherein front struts are attached to the first wing and a rear strut is attached to the second wing.

* * * * *